United States Patent [19]

Buchanan

[11] Patent Number: 4,733,441
[45] Date of Patent: Mar. 29, 1988

[54] RECLOSABLE COUPLINGS

[76] Inventor: Carroll A. Buchanan, SR3, Box 141 Catalina Dr., Chesapeake Ranch Estates, Lusby, Md. 20657

[21] Appl. No.: 48,948

[22] Filed: May 12, 1987

[51] Int. Cl.[4] .................. A01K 91/04; A44B 13/00
[52] U.S. Cl. ................... 24/573; 24/241 SL; 24/236; 24/238
[58] Field of Search ............... 70/459; 43/43.1, 44.83; 59/85, 87, 93; 24/116 R, 573, 370, 371, 373, 374, 599, 600, 699, 230.5 W, 241 R, 241 SL, 236, 237, 238, 241 S

[56] References Cited

U.S. PATENT DOCUMENTS

| 149,531 | 4/1874 | Sherrill | 59/85 |
|---|---|---|---|
| 859,660 | 7/1907 | Hill | 59/85 |
| 861,728 | 7/1907 | Hutchens | 59/93 |
| 1,719,662 | 7/1929 | Jones | 24/238 |
| 2,264,883 | 12/1941 | Lent | 24/237 |
| 2,601,709 | 7/1952 | Reichardt | 24/230.5 W X |
| 2,676,380 | 4/1954 | Lindquist et al. | 24/236 |

FOREIGN PATENT DOCUMENTS

| 176524 | 10/1953 | Austria | 24/370 |
|---|---|---|---|
| 86764 | 11/1895 | Fed. Rep. of Germany | 24/238 |

Primary Examiner—Peter A. Aschenbrenner
Assistant Examiner—James R. Brittain
Attorney, Agent, or Firm—John B. Armentrout

[57] ABSTRACT

Reclosable couplings are provided wherein a pair of first side portions of a link lap one another when the link is closed by means of a collar. Peripherally, the collar passes around the lapped first side portions and around a continuous second side portion of the link and is between a pair of stops connected with the first side portions of the link. The second side portion of the link is interconnected with the first side portions through a pair of bight portions. Meanwhile, the collar and the stops are relatively movable, for either of the first side portions and the related stop to be selected and deflected toward the second side portion of the link, so that the collar can be moved along the other first side portion of the link until the one of the first side portions and the related stop are outside the opening in the collar, thereby opening the coupling.

11 Claims, 8 Drawing Figures

RECLOSABLE COUPLINGS

The present invention relates in general to reclosable coupling devices and more particularly is concerned with new and improved reclosable fastenings having utility in the field of fishing.

An object of this invention is the provision of reclosable couplings which can be produced at sensibly low cost and are reliable when put to use.

Another obJect of this invention is to provide reclosable couplings which when closed are capable of withstanding appreciably large tensile loads conducted therethrough while interconnecting a plurality of apertured members in series, and yet are easily opened and reclosed.

Another object herein is the provision of reclosable couplings of the character indicated which effectively bar movement by the apertured members from one end to the other of the coupling after the apertured members have been introduced assigned to those respective ends and the coupling has been closed.

Other obJects of this invention in part will be obvious and in part pointed out more fully hereinafter.

As conducive to a clearer understanding of certain features of this invention, it is noted at this point that reclosable couplings are in demand in a wide variety of fields for interconnecting apertured members in series. Where small reclosable couplings are needed, many of the heretofore known couplings, in view of the structure thereof, are not well suited to resist tensile loads across the coupling, such as where the coupling is combined with a fishline loop, constituting a portion of a main fishline, and an apertured swivel or fish lure, hook lead loop, sinker lead loop, or other fishgear.

Then, too, many of the heretofore known reclosable couplings are quite intricate, making them difficult to produce and install, and in other instances the reclosable couplings fail to isolate one of the apertured members received on one end of the link from another apertured member received on the other end of the link, and accordingly the apertured members so coupled are more prone to become tangled. Further, there are reclosable couplings in the prior art which do afford a barrier in the coupling structure between opposite ends of the link, though the coupling can be opened for giving access to but one end of the link, making it necessary to tie one of the apertured members to the closed other end of the link.

Accordingly, it is a further object of this invention to achieve simple and reliable reclosable couplings which may be opened having a link to receive an apertured member onto selectively either of a pair of bight portions of the link, and which coupling also is characterized by affording a barrier between the bight portions of the link while the coupling is closed.

In accordance with this invention, reclosable couplings are provided comprising a collar and a resilient link. The link itself is characterized by including a pair of first side portions which are interconnected with a continuous second side portion by means of a pair of bight portions, with there further being a pair of stops connected with the pair of first side portions of the link. When the collar is assembled with the link, and the coupling is closed, the pair of first side portions lap one another and extend through the collar while the collar peripherally leads outside the second side portion of the link and between the stops. Furthermore, the collar and the stops are relatively movably interrelated. Either of the first side portions of the link, and the stop related thereto, can be selected and deflected toward the continuous second side portion of the link. Then, the collar is moved along the other first side portion of the link until the deflected first side portion of the link and the stop related thereto are outside the opening through the collar, thereby opening the coupling to receive an apertured member onto the related one of the bight portions of the link with access being had by insertion of the free stop and the related first side portion of the link through the aperture in the apertured member. Thereafter, the coupling is reclosed by deflecting the initially selected first side portion and the stop related thereto toward the continuous second side portion and moving the collar back to a position between the stops.

The resilient links preferably are proportioned relatively to the collar, for the lapped pair of first side portions side by side in the link to bias the collar into contact with the continuous second side of the link when the coupling is closed, thereby stabilizing the assembly and maintaining the stops as barriers outside the collar. Also, preferably, the stops are hooks which open toward one another when the coupling is closed, having the collar shiftable along the lapped pair of first side portions of the link to extend into a recess in either of the hooks while being outside the recess in the other of the hooks, thus in either instance for one of the hooks to be free to be deflected along with the related first side portion of the link toward the continuous second side portion of the link, for freeing the collar while the other of the hooks remains engaged with the collar.

It is found to be beneficial to shape the collar so that the collar is oblong having a maJor dimension from a first lateral end thereof to a second lateral end thereof, thus making the couplings be relatively compact. Meanwhile, the opening through the collar also beneficially is oblong, directed with major dimension from the aforementioned first lateral end of the collar to the aforementioned second lateral end of the collar, for the collar to confine the first lateral end portions of the link and the continuous second side portion of the link and achieve interlock of the collar with those link portions against rotation of the collar. By making the collar opening adequately wider across a recessed first lateral end portion of the collar than across a recessed second lateral end portion of the collar, also as preferred, the lapped first portions then beneficially are lodged side by side within the recessed first lateral end portion while the continuous second side portion of the link is lodged within the recessed second lateral end portion of the collar about equidistantly from the first pair of side portions of the link when the coupling is closed.

While the invention lends itself to the use of any one or more of a variety of materials in the reclosable couplings, resilient alloy metal wire, plain or coated, preferably is used for the body of the link such as where the wire defines the entire link including the stops. As a safeguard against corrosion of the link, stainless steel wire often is used. The collars in the couplings are also suitably composed, plain or coated, preferably being peripherally endless and in the form of short sleeves or rings, which for example are laterally oblong as referred to hereinbefore, and the collars may or may not be of the same materials or material as the related link.

In the accompanying drawing representing a preferred embodiment of a reclosable coupling provided in accordance with the present invention:

Figure 4:
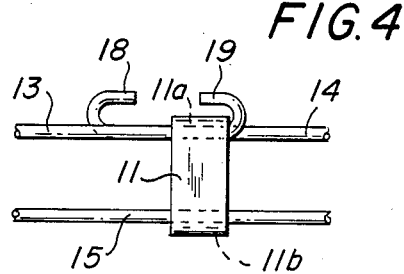
FIGS. 4 and 5 are front elevational fragmentary representations of the link side portions and hooks as they are interrelated with the collar in different positions of the collar.
Figure 5:
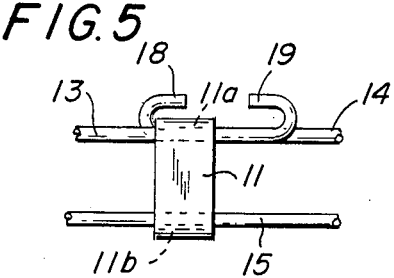
Figure 6:
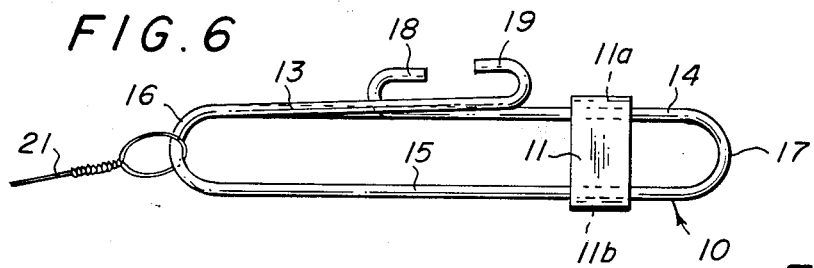
Figure 7:
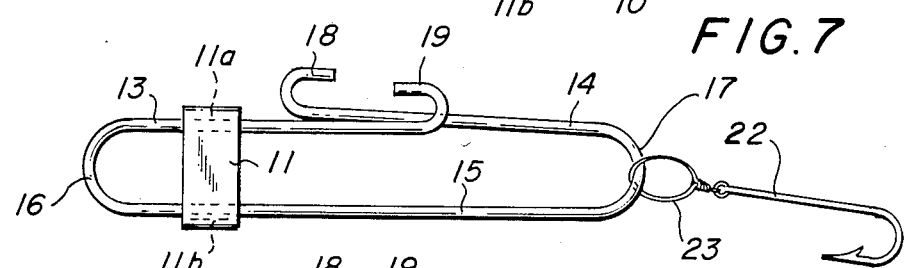
Figure 8:
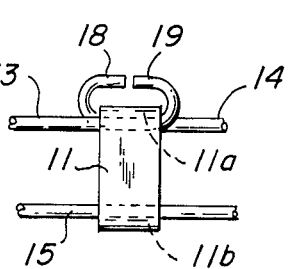

FIGS. 6 and 7 are front elevations of the coupling for different open positions of the coupling, and also show apertured members which have been received onto the link; and FIG. 8 is a front elevational view comparable to FIGS. 4 and 5, and represents positions of the hooks relatively to the collar attained under circumstances where tension across the coupling has reached large enough values to draw the hooks against the collar.

Like reference numerals are intended to apply to the same components throughout the several figures of the drawing.

Figure 1:
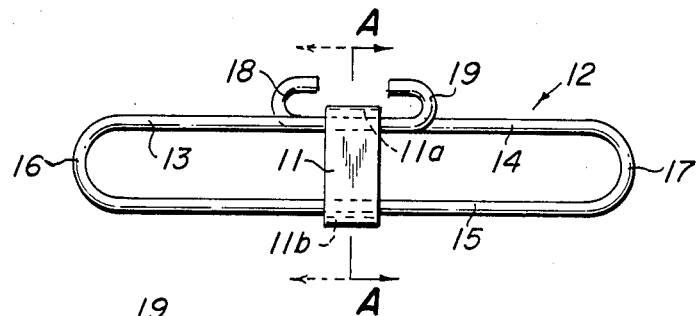
FIG. 1 is a front elevational view of the coupling.

Turning now more particularly to the drawings, and to the embodiment therein represented, a reclosable coupling 10 has a peripherally endless collar 11 located generally longitudinally centrally of a resilient wire link 12, when the coupling is closed as seen in FIG. 1. Link 12 includes a pair of first side portions 13 and 14 and an opposite continuous second side portion 15 which is interconnected with the first side portions 13 and 14 by means of a pair of bight portions 16 and 17. The opposite longitudinal end portions of the wire defining link 12 are provided forming hooks 18 and 19 which open toward one another when the coupling is closed as viewed in FIG. 1. Meanwhile, the collar 11 peripherally extends between the hooks 18 and 19, and surrounds the pair of first side portions 13 and 14 of the link which lap one another longitudinally through the collar 11, and the collar further peripherally extends around the continuous second side portion 15 of the link which interconnects the pair of bight portions 16 and 17.

As will readily be understood from FIGS. 6 and 7, the first side portions 13 and 14 of the link 12 are inherently resiliently sprung to move outwardly in the link from the collar 11 when released from the collar. With both of the first side portions 13 and 14 confined by the collar 11, as in FIG. 1, however, through having been deflected toward the continuous second side portion 15 of the link, the collar is biased to be against the continuous second side portion 15 inside the collar through having the first side portions 13 and 14 press side by side with reference to one another against the collar thereby maintaining the hooks 18 and 19 and the collar in position.

Figure 2:
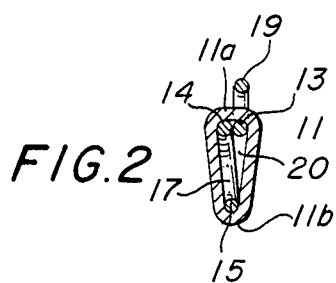
FIG. 2 is a transverse cross section taken in FIG. 1, and coming into view at line A—A in the direction of the full line arrows.
Figure 3:
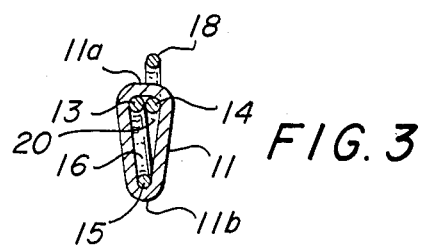
FIG. 3 is a cross section also taken at line A—A in FIG. 1, but coming into view in the direction of the dashed line arrows.

As best will be understood from FIGS. 2 and 3, the collar 11 has an opening 20 therethrough which is wider across a first lateral end portion 11a of the collar than across a second lateral end portion 11b of the collar which is opposite the first lateral end portion 11a. Furthermore, the collar 11 is elongated having a major dimension from the first lateral end portion 11a to the second lateral end portion 11b, and the opening 20 likewise is elongated in the same direction. Still further, the collar 11 is oblate along the first lateral end portion 11a both inside and outside the collar. The first side portions 13 and 14 of the link accordingly are accommodated side by side within the collar, and contact the first lateral end portion 11a while about equidistantly removed from the continuous second side portion 15 of the link which meanwhile contacts the second lateral end portion 11b inside the collar while the coupling 10 is closed, thereby having the collar 11 interlocked with the side portions 13, 14 and 15 against rotation relatively to the link 12.

Turning now to FIG. 5, it will be appreciated that the collar 11 is adapted to be moved on link 12 along the lapped pair of first side portions 13 and 14 and become engaged with hook 18 and disengaged from hook 19 while the coupling 10 is closed. In the latter positions of the hooks relatively to the collar 11, the first side portion 13 of the link and the related hook 19 can be manually deflected toward the second side portion 15 of the link, enabling the collar 11 then to be moved along the link for freeing the first side portion 13 and hook 19 from the collar. The resulting condition of the coupling 10 is represented in FIG. 6, after the first side portion 13 and hook 19 have been manually released. The coupling 10 thus is ready to receive an apertured member on link 12 by introducing hook 19 and the first side portion 13 through the aperture in the member and moving the apertured member onto the bight portion 16. In FIG. 6 an apertured member 21 so added is a looped portion of a main fishline having the bight portion 16 of the link through the loop opening. Following the introduction of the looped member, the reclosable coupling 10 may be returned to the closed FIG. 1 condition by manually deflecting the first side portion 13 and the related hook 19 and moving the collar 11 back to between the hooks 18 and 19. It will be noted that, in this, a part of the movement of the collar is strictly along the first side portion 14 and the second side portion 15 of the link.

Collar 11, furthermore, can be shifted along the first side portions 13 and 14 of the link 12 when the coupling 10 is closed, to reach a position indicated in FIG. 4, wherein the hook 18 is disengaged from the collar 11 and the hook 19 is engaged with the collar, thereby enabling the first side portion 14 and the hook 18 to be manually deflected toward the second side portion 15 of the link. By an ensuing movement of the collar 11, the collar is brought free of the deflected hook 18 and the related first side member 14 to a position shown in FIG. 7, wherein the deflected first side portion 14 and the related hook 18 of the link since have been manually released. In the FIG. 7 position, the coupling 10 has received an apertured leadline 23 of a fishhook 22 onto the bight portion 17 of the link by insertion of the link hook 18 and the related first side member 14 through the loop. By once more deflecting the first side portion 14 of the link and the related hook 18 toward the second side portion 15 of the link, the collar 11 then may be moved back to the FIG. 1 position, thus reclosing the coupling 10.

FIG. 8 represents both hooks 18 and 19 being against the opposite peripheral ends of the collar 11. That condition occurs when tension of an appropriate magnitude is applied across the coupling 10 from bight portions 16 and 17 and the coupling is closed.

As the invention lends itself to many possible embodiments and as many possible changes can be made in the embodiment hereinbefore set forth, it will be distinctly understood that all matter described herein is to be interpreted as illustrative and not as a limitation, the scope of which is indicated in the following claims.

I claim:

1. A reclosable coupling for interconnecting a plurality of apertured members, said coupling including: a resilient link comprising a pair of first side portions, a continuous second side portion, a pair of bight portions interconneoting said pair of first side portions with said continuous second side portion, and a pair of stops connected with said pair of first side portions, for said pair of first side portions to be deflective in said resilient link to carry said stops toward said continuous second side portion; and a collar having an opening therethrough entrant into first and second laterally opposite recessed end portions of said collar, means for said pair of first side portions of said link to be lapped side by side with one another and be about equidistantly spaced from said continuous second side portion of said link when said coupling is closed having said pair of first side portions of said link inside said recessed first lateral end portion of said collar and said continuous second side portion of said link inside said recessed second lateral end portion of said collar with said collar peripherally extending between said stops, and said collar and said stops being relatively movably interrelated, enabling either of said stops and said first side portion of said link related thereto to be selected and deflected toward said continuous second side portion of said link, and said collar then to be moved along the other of said first side portions of said link until said deflected first side portion of said link and the related said stop are outside said opening through said collar, thereby opening said coupling to receive a said apertured member onto said link.

2. A reclosable coupling as set forth in claim 1, wherein both of said first side portions of said link are in contact with said recessed first lateral end portion of said collar inside said collar when said coupling is closed and bias said collar to have said recessed second lateral end portion of said collar in contact with said continuous second side portion of said link inside said collar.

3. A reclosable coupling as set forth in claim 2, wherein said opening through said collar where defined by said recessed first lateral end portions is wider than where defined by said recessed second lateral end portion, to have said lapped first side portions of said link be in contact side by side with said recessed first lateral end portion of said collar while said second lateral end portion of said collar contacts said continuous second side portion of said link and said coupling is closed having said collar interlocked with said first side portions of said link and with said continuous second side portion of said link against rotation.

4. A reclosable coupling as set forth in claim 1, wherein said collar is interlocked with said first side portions of said link and with said continuous second side portion of said link against rotation while said coupling is closed.

5. A reclosable coupling as set forth in claim 1, wherein both of said first side portions of said link are in contact with said recessed first lateral end portion of said collar inside said collar when said coupling is closed and bias said collar to have said recessed second lateral end portion of said collar in contact with said continuous second side portion of said link inside said collar, and said collar is interlocked with said first side portions of said link and with said continuous second side portion of said link against rotation while said coupling is closed.

6. A reclosable coupling as set forth in claim 1, wherein said stops include a pair of hooks, for said hooks to open toward said collar while said coupling is closed.

7. A reclosable coupling as set forth in claim 1, wherein said stops include a pair of hooks, for said collar to be shifted along said lapped first side portions of said link to be brought into engagement with selectively either of said hooks and disengaged from the other of said hooks while said coupling is closed.

8. A reclosable coupling as set forth in claim 7, wherein both of said hooks engage said collar in said closed coupling should tensile load, when applied across said coupling from said bight portions of said link, become appropriately intense.

9. A reclosable coupling as set forth in claim 1, wherein, in said link, said pair of first side portions, said continuous second side portion and said pair of bight portions include portions of a wire interconnecting said pair of stops.

10. A reclosable coupling as set forth in claim 9, wherein, in said link, said stops include a pair of hooks, for said hooks to open toward said collar when said coupling is closed, and said hooks include longitudinal end portions of said wire.

11. A reclosable coupling as set forth in claim 1, wherein said collar peripherally is endless.

* * * * *